(12) United States Patent
Meier

(10) Patent No.: US 8,777,246 B2
(45) Date of Patent: *Jul. 15, 2014

(54) COMPRESSED AIR SUPPLY SYSTEM AND CONTROL METHOD

(71) Applicant: WABCO GmbH, Hannover (DE)

(72) Inventor: Jorg Meier, Hessisch Oldendorf (DE)

(73) Assignee: WABCO GmbH, Hannover (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/754,214

(22) Filed: Jan. 30, 2013

(65) Prior Publication Data

US 2013/0192681 A1 Aug. 1, 2013

(30) Foreign Application Priority Data

Jan. 31, 2012 (DE) .......................... 10 2012 001 734

(51) Int. Cl.
*B60G 11/27* (2006.01)
*B60G 17/052* (2006.01)
*B60G 17/056* (2006.01)
*F17D 1/02* (2006.01)

(52) U.S. Cl.
CPC .............. *F17D 1/02* (2013.01); *B60G 17/0565* (2013.01); *B60G 2500/2021* (2013.01); *B60G 17/0523* (2013.01); *B60G 2500/2044* (2013.01); *B60G 2500/204* (2013.01)
USPC ................... 280/124.16; 137/487.5; 137/597; 267/64.28; 280/5.514; 280/6.157

(58) Field of Classification Search
CPC ........... B60G 17/0155; B60G 17/0525; B60G 17/0528; B60G 17/056; B60G 17/0565; B60G 17/0523; B60G 2202/152; B60G 2202/154; B60G 2500/302; B60G 2500/2042; B60G 2500/2044

USPC ................... 137/12, 487.5, 565.18, 597, 613, 137/624.13, 624.15; 180/41; 267/64.28; 280/5.514, 6.157, 124.16

See application file for complete search history.

(56) References Cited

U.S. PATENT DOCUMENTS 4,695,074 A * 9/1987 Kobayashi et al. ........ 280/6.157
4,709,934 A * 12/1987 Suzuki et al. .............. 280/6.157

(Continued)

FOREIGN PATENT DOCUMENTS

| DE | 10 223 405 | 12/2003 |
|---|---|---|
| DE | 10 2009 029 898 | 12/2010 |
| EP | 0 978 397 | 2/2000 |
| EP | 1 165 333 | 1/2002 |

*Primary Examiner* — Faye M Fleming
*Assistant Examiner* — Laura Freedman
(74) *Attorney, Agent, or Firm* — Kramer Levin Naftalis & Frankel LLP

(57) ABSTRACT

A compressed air supply assembly for operating a pneumatic assembly includes a compressed air supply; a compressed air connection to the pneumatic assembly; a purge connection to the environment; a pneumatic main line between the compressed air supply and the compressed air connection comprising an air dryer; a purge line between the compressed air connection and the purge connection; and a solenoid valve arrangement with a control valve to control a purge valve. The control valve is connected to a control valve connection in a pneumatic control line connected to a pressure control connection of the purge valve; and the purge valve is connected to a purge valve connection in the purge line. A pressure-maintaining device is connected to the pneumatic control line and maintains control pressure at the pressure control connection when the purge valve connection is open, independently of pressure in the purge line and/or the main line.

18 Claims, 6 Drawing Sheets

(56) References Cited

U.S. PATENT DOCUMENTS

| | | | |
|---|---|---|---|
| 4,755,196 A * | 7/1988 | Frania et al. ................... 96/116 |
| 4,881,753 A * | 11/1989 | Shima et al. ............... 280/6.157 |
| 5,048,867 A * | 9/1991 | Gradert ...................... 280/6.159 |
| 5,600,953 A * | 2/1997 | Oshita et al. ................... 60/453 |
| 5,711,150 A * | 1/1998 | Oshita et al. ................... 60/407 |
| 6,116,586 A * | 9/2000 | Westerkamp et al. ...... 267/64.28 |
| 6,266,590 B1 * | 7/2001 | Kutscher et al. ................ 701/37 |
| 6,332,623 B1 | 12/2001 | Behmenburg et al. |
| 6,354,617 B1 * | 3/2002 | Behmenburg et al. . 280/124.157 |
| 6,623,016 B2 * | 9/2003 | Sulzyc et al. .............. 280/5.514 |
| 6,726,189 B2 * | 4/2004 | Folchert et al. ............ 267/64.16 |
| 6,726,224 B2 * | 4/2004 | Jurr et al. ................... 280/5.514 |
| 6,799,950 B2 * | 10/2004 | Meier et al. ..................... 417/12 |
| 6,817,600 B2 | 11/2004 | Ocker et al. |
| 6,845,988 B2 * | 1/2005 | Romer et al. .............. 280/5.514 |
| 7,255,358 B2 * | 8/2007 | Kim ......................... 280/124.16 |
| 7,331,592 B2 * | 2/2008 | Heer ........................ 280/124.16 |
| 7,552,932 B2 * | 6/2009 | Matern et al. ............ 280/124.16 |
| 8,447,466 B2 * | 5/2013 | Meier et al. ..................... 701/36 |
| 8,490,641 B2 * | 7/2013 | Schnittger et al. ........ 137/115.25 |
| 2002/0153688 A1 | 10/2002 | Jurr et al. |
| 2012/0073669 A1 | 3/2012 | Diekmeyer |
| 2013/0042932 A1 * | 2/2013 | Bodet et al. ................. 137/544 |
| 2013/0062541 A1 * | 3/2013 | Diekmeyer et al. ............. 251/12 |
| 2013/0195682 A1 * | 8/2013 | Becher et al. ................... 417/53 |
| 2013/0255609 A1 * | 10/2013 | Frank et al. ................ 123/90.14 |
| 2013/0255787 A1 * | 10/2013 | Frank et al. ....................... 137/1 |
| 2013/0276899 A1 * | 10/2013 | Frank et al. ....................... 137/1 |

* cited by examiner

COMPRESSED AIR SUPPLY SYSTEM AND CONTROL METHOD

CROSS-REFERENCE TO RELATED APPLICATION

This application claims the benefit of DE 10 2012 001 734.0 filed on Jan. 31, 2012, the disclosure of which is hereby incorporated herein by reference in its entirety.

FIELD OF THE INVENTION

The present invention generally relates to a compressed air supply assembly for operating a pneumatic assembly, such as, for example, an air spring assembly of a vehicle.

BACKGROUND OF THE INVENTION

Compressed air supply assemblies are used in vehicles of all types to supply vehicle air spring assemblies with compressed air. Air spring assemblies can comprise level control devices that can be used to adjust the distance between the vehicle axle and vehicle superstructure. An air spring assembly of such a pneumatic system comprises a number of air bellows pneumatically connected to a common line (gallery) and can raise the vehicle superstructure as fill levels increase and lower it as fill levels decrease. As the distance between the vehicle axle and the vehicle superstructure, or the ground clearance, increases, the spring travel becomes longer and greater ground unevenness can be overcome without contact with the vehicle superstructure. Such systems are used in off-road vehicles and sport utility vehicles (SUVs). In SUVs with very powerful engines, it is desirable to provide the vehicle with comparatively low ground clearance for high speed road travel, and with comparatively high ground clearance for off-road use. It is furthermore desirable to implement the change in ground clearance as quickly as possible, which increases the requirements with regard to speed, flexibility and reliability of a compressed air assembly.

A compressed air supply assembly for use in a pneumatic system with a pneumatic assembly, for example an air spring assembly of the general type discussed above, is operated with compressed air from a compressed air supply, for example within a pressure range from 5 to 20 bar. The compressed air is provided to the compressed air supply by means of an air compressor, for example a compressor blower or where applicable a double compressor blower. To supply the pneumatic assembly, the compressed air supply is pneumatically connected with a compressed air connection and on the other side is pneumatically connected with a purge connection. Via a solenoid valve arrangement forming a purge valve arrangement, by allowing the air to escape into one or more purge connections, the compressed air supply assembly can be purged to the environment.

Providing an air dryer to dry the compressed air supplied to the system ensures long-term operation of the compressed air supply assembly. That is, the air dryer prevents the accumulation of moisture in the pneumatic system, which otherwise could lead to valve-damaging crystal formation at comparatively low temperatures and also to undesirable defects in the compressed air supply assembly and in the pneumatic assembly. An air dryer has a drying medium, normally a granulate bulk product, through which the compressed air can flow so that, at comparatively high pressure, the granulate can absorb the moisture contained in the compressed air. An air dryer can, where applicable, also be designed as a regenerative air dryer, whereby, in each purge cycle, at comparatively low pressure, the dried compressed air from the air suspension system can flow through the granulate in the reverse direction or in the same direction relative to the filling direction. For this, the purge valve arrangement can be opened. For such an application, also known as pressure change adsorption, it is desirable to design the compressed air supply assembly to allow a comparatively rapid purging but nonetheless with a pressure change sufficient for regeneration of the air dryer. It is also desirable to carry out the purging process for a compressed air supply assembly with as high a purge pressure amplitude as possible, i.e., from an operating pressure to a purge pressure. However, the components of the solenoid valve arrangement should not be over-dimensioned or made too complex in construction.

So-called direct purge circuits—without control valve—can render superfluous the functionality of a solenoid valve arrangement of the type discussed above with control and purge valve. However, in such direct purge circuits, the nominal width of the purge valve must be designed to be comparatively large to allow rapid purging, but, at the same time, it is limited by the current absorption of a magnetic coil for the purge valve, so that, in the end, only limited switching pressure differences can be achieved.

EP 1 165 333 B2 describes a compressed air supply assembly of the general type discussed above, which comprises a solenoid valve arrangement with a control valve to control a purge valve. The control valve is connected with a valve connection in a control line that is connected to a pressure control connection of the purge valve. The purge valve is connected with a valve connection in the purge line. These and similar compressed air supply assemblies in principle allow rapid purge switching. The control valve is typically a 3/2-way valve and is switched by pressure provided by an air bellows of the pneumatic main line or by a control pressure taken from this. The control pressure, which can thus be delivered to the pressure control connection of the purge valve, actuates the opening of the valve connection of the purge valve in the purge line and thus initiates the purging of the compressed air supply assembly.

However, a disadvantage of compressed air supply assemblies that follow such a basic concept—such as for example the assemblies described in DE 102 23 405 B4 or EP 0 978 397 B1 or DE 10 2009 029 898 A1—is that a relay piston of the purge valve normally requires a closure-maintaining force provided by a valve spring, so that a residual pressure—and corresponding pre-control pressure—must be reserved in the system for the relay piston of the purge valve. The closure-maintaining force of the valve spring is required, for example, to enable the air compressor to deliver against comparatively high pressures. Also, the opening behavior of the purge valve must be taken into account for a residual pressure. These circumstances regularly lead to the reservation of a minimum bellows pressure necessary to constitute a pre-control pressure, for example in the range of one or a few bar, in order to be able to provide a fundamental purge functionality of the solenoid valve arrangement. Residual pressures can lie in the range from 1 or 2 to 3 bar, so that in a design of the compressed air supply assembly, a lower pressure limit for a bellows pressure of 3 bar or more must be defined. Despite such a design, depending on operating circumstances, partly closed valve cross sections can occur; these in turn can lead to a significantly reduced regeneration behavior in an air dryer and hence to unstable system operating states.

SUMMARY OF THE INVENTION

Generally speaking, it is an object of the present invention to provide a compressed air supply assembly, and a pneumatic system with a compressed air supply assembly that, based on a solenoid valve arrangement with a control valve and a purge valve, provide improved purge functionality with comparatively high pressure amplitude. The solenoid valve arrangement in the compressed air supply assembly is desirably of simple design with rapid functionality to avoid or reduce the possibility of deterioration of functionality. This object is achievable by a modification of a conventional rapid purging system, and, where applicable, a peripheral element of the compressed air supply assembly, such as for example a pneumatic assembly or control electronics.

It is also an object of the present invention to provide a method for controlling the inventive compressed air supply assembly and/or pneumatic assembly.

According to an embodiment of the present invention, a pressure-maintaining pneumatic device is connected to the control line. The device is configured to maintain a control pressure at the pressure control connection when the purge valve connection of the purge valve in the purge line is open, independently of a pressure in the purge line and/or the pneumatic main line. A connection to the control line also comprises a connection in the control line. The pressure-maintaining pneumatic device with a connection can be connected to the control line only with the one connection; to this extent it can only be connected unilaterally, as may be the case for example with a pressure accumulator, a pressure reservoir or a bellows or a compressor blower. Also a pneumatic device with two or more connections for maintaining pressure can be connected to the control line with the two connections, or, where applicable, multiple connections; to this extent it is integrated in the control line bilaterally as may be the case for example with a valve, in particular a 2/2-way valve. The valve can also comprise further connections that are not connected with the control line, as may be the case for example with a 3/2-way valve.

In accordance with another embodiment of the present invention, a pneumatic system includes the inventive compressed air supply assembly and a pneumatic assembly in the form of an air spring assembly, wherein the air spring assembly comprises a gallery with at least one branch line pneumatically connected with the gallery, with a bellows and/or a pressure accumulator and/or a directional valve arranged before the bellows and/or pressure accumulator.

In accordance with a further embodiment, a method for controlling the inventive compressed air supply assembly and/or pneumatic assembly includes:
building up control pressure at the pressure control connection of the purge valve,
opening the valve connection of the purge valve into the purge line, and
maintaining the control pressure at the pressure control connection of the purge valve when the valve connection of the purge valve is open, independently of pressure in the purge line and/or the pneumatic main line.

It will be appreciated that the present invention is based on the consideration that, while the conventional solenoid valve arrangement with a control valve to control a purge valve in a compressed air supply assembly has proved successful in principle, the use of a bellows pressure present in a pneumatic main line to constitute a control pressure at a pressure control connection of the purge valve can be a hindrance with regard to a residual maintaining pressure, in particular a residual bellows pressure. A necessary residual maintaining pressure can have a restrictive effect if an effective pressure change absorption to regenerate a dryer or a high spring amplitude in an air spring assembly is to be achieved or optimized. The invention is based in particular on the consideration that a measure relating to the residual maintaining pressure, as required in the prior art for the purge functionality of a compressed air supply assembly, can where applicable be a hindrance if a particularly rapid purge functionality is to be achieved. Nonetheless the simple structure of a solenoid valve arrangement with a control valve to control a purge valve in order to maintain a rapid purge functionality should not be excessively complicated or should be kept comparatively simple.

Based on such considerations, according to the invention, it is possible to provide a pressure-maintaining pneumatic device connected to the control line, whereby it is unnecessary to constitute the control pressure from bellows pressure. The invention provides a pressure-maintaining pneumatic device adapted to not only maintain a control pressure at the pressure control connection when the valve connection of the purge valve in the purge line is open, but to maintain this control pressure independently of a pressure in the purge line and the pneumatic main line.

This concept of a pressure-maintaining pneumatic device, which functions independently of a bellows pressure, supports both a comparatively high pressure change amplitude and a rapid purge functionality. Also a pressure-maintaining pneumatic device in the control line, in addition to the solenoid valve arrangement and/or with modification of the solenoid valve arrangement, in particular the control valve, can be achieved comparatively simply and without excessive modification of a conventional solenoid valve arrangement.

Preferably, suitable pressure maintenance is provided in the pressure-maintaining pneumatic device, which preferably can be implemented by a modification of the solenoid valve arrangement and/or using pneumatic components of a peripheral element of the compressed air supply assembly, such as for example a pneumatic assembly. Pressure maintenance in principle means maintaining a constant pressure—that is, a pressure that is independent of the bellows pressure, in particular independent of the pressure in the purge line and the pneumatic main line.

Put simply, according to embodiments of the present invention, the pressure-maintaining pneumatic device is configured to constitute a control pressure at the pressure control connection of the purge valve and provide a constant pressure as a control pressure implemented independently of the bellows pressure. In particular, a pneumatic blocking device is suitable here for blocking the control line after a certain control pressure has been built up, and/or pneumatic sources that can provide a comparatively constant pressure to a control line independently of a bellows pressure.

According to a preferred embodiment, the pressure-maintaining pneumatic device is adapted to maintain a pressure at the pressure control connection when the valve connection of the purge valve in the purge line is open such that a pressure in the purge line and/or the pneumatic main line can fall variably below a residual maintaining pressure. A residual maintaining pressure in particular is a residual pressure that is predefined by a valve spring of the purge valve. This allows the control pressure to be adjusted variably, i.e., independently of bellows pressure and in a range below the residual pressure.

This can be used in a further refinement of the invention to allow purging of the compressed air supply assembly down to ambient pressure. Preferably, the pressure-maintaining pneumatic device is adapted to maintain a pressure at the pressure control connection when the valve connection of the purge valve in the purge line is open such that a pressure in the purge line and the pneumatic main line can fall practically to ambient pressure.

According to a preferred embodiment, the pressure-maintaining pneumatic device can be formed with the control valve itself, which can be modified comparatively easily by deviation from a 3/2-way valve. That is, the advantages of a 3/2-way valve as a control valve can be waived in favor of a simplified mechanical design of the control valve. The simplified control valve can preferably have two valve connections that are connected in the control line, and no valve connection to the environment. In particular the control valve can be a 2/2-way valve. This is because the control line can also be purged into the pneumatic main line and via the air dryer. The solenoid valve arrangement can be of comparatively simple and fast-switching design.

Electromagnetic functionality and/or a control process for the control valve can be extended in an improved manner to form an advantageous pressure-maintaining pneumatic device according to this embodiment. That is, the control valve is refined with a suitable electromagnetic interval control functionality. Advantageously, the control valve can be electromagnetically interval-controllable. This means that an opening and closing process of the control valve takes place in close temporal succession—in particular, initiated by a control pulse pair; i.e., for example a combination of a connect and disconnect process for a current to a magnetic coil—such that a sufficient control pressure can be built up at the pressure control connection of the purge valve and immediately thereafter the second part of the control line connected to the control connection can be closed. As part of such interval control functionality, of the control valve, e.g., of a 2/2-way valve—independently of the pressure in the purge line and the pneumatic main line—a control pressure can be maintained at the pressure control connection of the purge valve when the valve connection of the purge valve is opened.

By means of the electromagnetic interval control functionality, at the start of a control interval, to build up the control pressure at the pressure control connection of the purge valve into the control line, the two valve connections of the control valve must be opened; at the end of the control interval, to maintain the control pressure at the pressure control connection, the two valve connections must be closed. Put simply, the control valve, preferably a 2/2-way valve, is formed as a solenoid valve and is controlled by means of a control pulse pair delimiting the control interval such that the control valve opens at the start of the control interval and closes at the end of the control interval. The duration of a control interval should be just sufficient to build up the control pressure and can preferably lie substantially below 1 second.

The control pressure can be provided by a suitable constant-pressure source. The control pressure can, for example, be branched from a branch line leading to a pressure accumulator or bellows or similar reservoir or from the reservoir itself, for example provided by an air compressor, in particular directly from the main pneumatic line during operation of the air compressor.

Also, the control line can be connected to a pressure accumulator. Preferably, it can branch directly from an accumulator branch line leading to the pressure accumulator. The pressure accumulator allows a control pressure to be created with comparatively little complexity, independently of pressure in the purge line and the pneumatic main line. When the valve connection of the purge valve in the purge line is open, the main line and the purge line, in particular a bellows with variable residual pressure, can be purged to an ambient pressure.

Moreover, the control line can be connected to a bellows. In particular, it can branch directly from a bellows branch line leading to the bellows.

The accumulator branch line and/or bellows branch line or the pressure accumulator and/or the bellows are preferably components of a pneumatic assembly of the pneumatic system. This has the advantage that a modification to an existing pneumatic line system can be implemented comparatively easily or constructed using former pneumatic lines. In particular, the control line can be connected to a pressure accumulator with no connection to the pneumatic main line.

Alternatively, the control line can be connected, preferably switchably, to an air compressor and/or bellows and/or pressure accumulator. In particular, the control line can be connected directly to the air compressor and/or to a branch line connected to the air compressor, preferably directly. The same applies to the connection to the bellows and/or the pressure accumulator. The control line can also branch preferably directly from the pneumatic main line. Via the main line, the pressure amplitude of an air compressor, i.e., from the compressed air supply, can be used to build up a defined controlled pressure. Here, various additional advantageous possibilities arise for defining the control pressure situation-dependently, for example by a predefined establishment of the interval length of the control interval and/or the compressor activity. Preferably, the main pneumatic line can be flooded with a reservoir pressure by opening a directional valve, in particular a directional valve arranged before the pressure accumulator and/or bellows and/or compressor. An additional reservoir branch line can advantageously be dispensed with.

It should be appreciated that the embodiments described above can be implemented alone or in combination.

A method according to another embodiment of the present invention includes:
  connecting a pressure-maintaining pneumatic device in the form of a suitable constant-pressure source to the control line,
  building up control pressure at the pressure control connection of the purge valve by opening the control valve in the form of a 2/2 directional valve, and
  maintaining the control pressure at the pressure control connection of the purge valve by closing the control valve, the opening and closing of the control valve taking place within the context of electromagnetic interval control of the control valve.

For the purge of the compressed air supply assembly, the purge valve connection of the purge valve in the purge line is opened. Maintaining the control pressure thus takes place with the purge valve connection of the purge valve open, regardless of a pressure in the purge line and/or the pneumatic main line.

Utilizing an electromagnetic interval control functionality, it is possible for a control valve of relatively simple design—in particular a 2/2 directional valve as a solenoid valve—to be variably controlled in a suitable, in particular demand-dependent manner. That is, it is possible for such a control valve to be controlled independently of a pressure in the purge line and/or the pneumatic main line.

This is not restricted to a purging process; it is basically possible during any required control process for the control valve to be controlled utilizing an electromagnetic interval control functionality, for example also within the context of a filling function of a pressure valve or of a tire or within the context of a raising function for the pneumatic assembly.

Within the context of a first interval control functionality, for a purge process, a residual pressure in the pneumatic main line, in particular in a bellows and/or a pressure accumulator or some other reservoir is avoided. In other words, during the course of a purging process, a bellows can be purged to an ambient pressure or approximately to ambient pressure. For this purpose, a directional valve arranged before the bellows and/or the pressure accumulator can be opened for a sufficiently long time. It is also possible for pressure to be measured in a bellows and/or in the pressure accumulator and for a directional valve arranged before the bellows and/or the pressure accumulator to remain opened, as a function of the pressure measurement value, until the desired ambient pressure or else a suitable residual pressure higher than the ambient pressure prevails in the bellows or pressure accumulator.

The interval-controllable control valve can be controlled with a first electromagnetic control interval before or at the start of the purging process and with a second electromagnetic control interval at or after the end of the purging process. A first electromagnetic control interval before or after the opening of a directional valve arranged before the bellows and/or the pressure accumulator is preferred.

It is possible for a first electromagnetic interval control of the control valve to be performed before, during or after the opening of a directional valve arranged before the bellows and/or the pressure accumulator. In particular, a second electromagnetic interval control of the control valve can be performed during or after the closing of a directional valve arranged before the bellows and/or the pressure accumulator.

The method embodiment may also be utilized to maintain a residual pressure in the bellows. For this purpose, it is possible in a modified manner for the control valve to be controlled with an electromagnetic control interval at the start of a purging process; in other words, a purging process may be started and ended within an electromagnetic control interval.

Advantageously, a second electromagnetic interval control of the control valve can be performed at a time that is dependent on a magnitude of a pressure in the bellows. In particular, the time may be selected—preferably by means of a check of a measured pressure value—such that the pressure in the bellows corresponds to a predefined residual pressure or ambient pressure.

Still other objects and advantages of the present invention will in part be obvious and will in part be apparent from the specification.

The present invention accordingly embodies features of construction, combina-tions of elements, arrangement of parts, and the various steps and the relation of one or more of such steps with respect to each of the others, all as exemplified in the following detailed disclosure, and the scope of the invention will be indicated in the claims.

BRIEF DESCRIPTION OF THE DRAWINGS

For a fuller understanding of the inventive embodiments, reference is had to the following description taken in connection with the accompanying drawings in which.

LIST OF REFERENCE NUMERALS

| | |
|---|---|
| 0 | Air supply connection |
| 1 | Compressed air supply |
| 2 | Compressed air connection |
| 3 | Purge connection |
| 10 | Compressed air supply assembly |
| 20 | Air supply line |
| 21 | Compressor unit |
| 21.1 | Compressor blower |
| 21.2 | Electric motor |
| 22 | Air supply |
| 23 | Filter |
| 24.1, 24.2 | Non-return valve |
| 40 | Databus |
| 41, 47 | Power lines |
| 42 | Relay |
| 43, 46 | Electrical control lines |
| 44, 45, 48 | Sensor lines |
| 50 | Plug connection |

-continued

| | |
|---|---|
| 60 | Pneumatic main line |
| 61 | Air dryer |
| 62 | Choke |
| 63 | Branch connection of pneumatic main line |
| 70 | Purge line |
| 71 | Purge valve |
| 72 | Purge valve spring |
| 74 | Relay pressure limiter |
| 80 | Solenoid valve assembly |
| 81 | Control valve |
| 82 | Control valve spring |
| 90 | Pneumatic assembly |
| 91 | Bellows |
| 91L | Bellows branch line |
| 92 | Pressure accumulator |
| 92L | Accumulator branch line |
| 93, 93.S | Directional valve |
| 94 | Pressure sensor |
| 95 | Gallery |
| 96 | Further pneumatic line |
| 97 | Height sensors |
| 98 | Valve block |
| 99 | Bellows pressure sensor |
| 100 | Pneumatic system |
| 110 | Pneumatic control line |
| 110.1, 110.2 | First part, second part of the pneumatic control line |
| 111 | Non-return valve |
| 120 | Pressure-maintaining pneumatic device |
| 200 | Vehicle superstructure |
| 210 | Front axle |
| 220 | Rear axle |
| 1000 | Vehicle |
| X1, Y1 | First, second purge valve connection |
| X2, Y2 | First, second control valve connection |
| AV, EV, VV, K, RV | Characteristic curve |
| $T_S$, $T_E$ | Time |
| Ti1, Ti2 | Time interval |

DETAILED DESCRIPTION OF THE PREFERRED EMBODIMENTS

Figure 1:
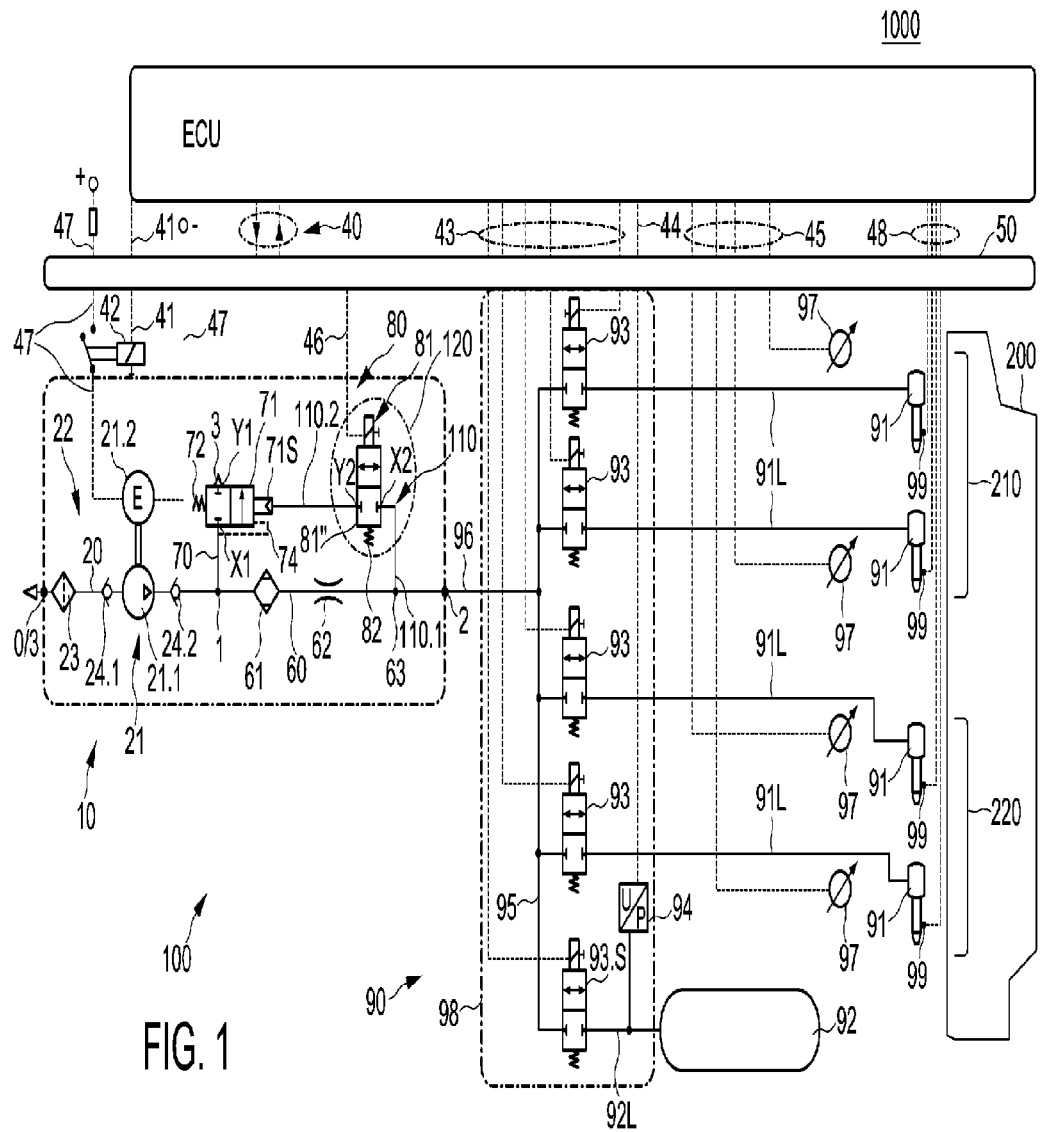
FIG. 1 depicts a pneumatic system with a compressed air supply assembly and a pneumatic assembly in accordance with an embodiment of the present invention, wherein a solenoid valve arrangement is provided with a control valve to control a purge valve, and a pressure-maintaining pneumatic device is formed by means of a modified control valve in the form of a 2/2-way valve with an electromagnetic, interval control functionality such that the 2/2-way valve can be opened briefly to build up and then maintain the control pressure, and then be closed.

Referring now to the drawing figures, FIG. 1 shows a pneumatic system 100 with a compressed air supply assembly 10 and a pneumatic assembly 90 for a vehicle 1000 indicated symbolically. The pneumatic system 100 is connected for control purposes to an ECU, as an electronic vehicle controller, via a plug connection 50 and a databus 40, wherein various electrical control and sensor lines or power lines, designated 41, 42, 43, 44, 45, 46, 47, 48 and drawn thinly, are provided for the compressed air supply assembly 10, pneumatic assembly 90, and sensors and relay circuit.

In concrete terms, for monitoring and controlling the pneumatic system 100, the ECU is connected via the databus 40 and the electrical control and sensor lines and a plug connection 50; the electrical control lines include first electrical control lines 43 for powering magnetic coils of the solenoid directional valves 93 in the pneumatic assembly 90, and a second electrical control line 46 for powering the magnetic coil of a control valve 81 in the form of a solenoid directional valve of a solenoid valve assembly 80 in the compressed air supply assembly 10. The first electrical control lines 43 serve to supply control power to the bellows and accumulator valves, formed as solenoid valves, in the form of directional valves 93, 93.S. The second electrical control line 46 serves to supply control power to the control valve 81, 81', 81" formed as a solenoid valve.

In addition first electrical sensor lines 45 are provided to height sensors 97 in the pneumatic assembly 90 and a second electrical sensor line 44 to a pressure sensor 94 in the accumulator branch line 92L to a pressure accumulator 92. To this end, the first electrical sensor lines 45 are connected to the height sensors 97. The second electrical sensor line 44 is connected to the pressure sensor 94, which measures a pressure of the pressure accumulator 92 in the accumulator branch line 92L. In addition, third sensor lines 48 can also be provided to the bellows pressure sensors 99.

Also, power lines 47 are provided for other electromagnetic components such as the power line 47 with a relay 42 to operate the electric motor 21.2 of a compressor unit 21, and an electrical control line 41 to relay 42. The electric motor 21.2 can be controlled via the power line 47 serving as an electrical switch line, the electrical control line 41 and the controllable relay 42.

FIG. 1 shows the compressed air supply assembly 10 for operating the pneumatic assembly 90—an air spring assembly of a vehicle superstructure 200 of a vehicle 1000, indicated symbolically with front axle 210 and rear axle 220. The compressed air supply assembly 10 has a compressed air supply 1 and a compressed air connection 2, wherein compressed air can be supplied to the compressed air supply 1 via an air supply 22. The compressed air can be guided in the filling direction between the compressed air supply 1 and the compressed air connection 2 via a pneumatic main line 60 and supplied to the pneumatic assembly 90. For this, in the air supply 22, there are arranged in the air supply line 20 an air connection 0 provided for air intake, a filter 23 and a compressor unit 21. The compressor unit 21 is arranged between a first and a second non-return valve 24.1, 24.2, wherein a compressor blower 21.1 in the compressor unit 21 can be driven via an electric motor 21.2.

In the pneumatic main line 60, there are an air dryer 61 and a choke 62. A purge line 70 branches from the pneumatic line 60 to the compressed air supply 1 and continues via a purge valve 71 to a purge connection 3. The purge connection 3 is formed directly with a second purge valve connection Y1 of the purge valve 71 on the purge side. The first purge valve connection X1 on the pressure side, opposite the second purge valve connection Y1 of the purge valve 71, is connected to the purge line 70. The purge valve 71 is a 2/2-way relay valve that has a pressure control connection 71S. The purge valve has a first purge valve connection X1, which is connected to the compressed air supply 1 via the purge line 70. The second purge valve connection Y1 is formed as a purge connection 3 or can be connected to a purge connection 3.

Also a pressure limiter 74, in particular relay-operated, is provided on the purge valve 71 such that the pressure for opening the purge valve 71 is limited by drawing off pressure in the purge line 70 via the pressure limiter 74. In this way, even at a comparatively high operating pressure, a degree of variability or tolerance can be achieved with regard to pressure limitation. A power-controlled pressure limiter 74 is implemented in that the switch point of the purge valve 71 is variably adjustable depending on the current intensity of a control current for the control valve 81. This means that the current intensity in the magnet part (coil) in the control valve 81 determines the switching point of the pneumatic part (purge valve 71 as relay valve). Depending on vehicle situation, the system temperature or other pressure-relevant system parameters, the switch point of the pneumatic part, i.e., the purge valve 71 formed as a relay valve, can be set variably with the active current intensity. Because of the pressure limiter 74, which is current-controlled, it is ensured that the gallery pressure does not exceed the static opening pressure of a bellows valve, formed as a solenoid valve, in the form of a directional valve 93 (a level control valve) and an internal pressure of a bellows 91. Apart from in the gallery 95, the pressure can be measured at a pressure accumulator 92, namely, via the pressure sensor 94, directly at the pressure accumulator 92 or via a line connected to the accumulator branch line 92L.

A solenoid valve arrangement 80 is provided with control valve 81 as a solenoid valve to control a purge valve 71 as a relay valve. The control valve 81 is here connected with a first valve connection X2 and a second control valve connection Y2 in a pneumatic control line 110. The first control valve connection X2 is connected to the branch connection 63 of the pneumatic main line 60 via a first part 110.1 of the pneumatic control line 110. The second control valve connection Y2 is connected to the pressure control connection 71S of the purge valve 71 via a second part 110.2 of the pneumatic control line 110.

The pneumatic assembly 90 comprises, arranged in a valve block 98, five level control valves, which are all formed as bellows or accumulator valves in the form of directional valves 93, 93.S—namely, in the form of a solenoid directional valve (as a 2/2-way solenoid valve). In the valve block 98, the bellows or accumulator valves formed as solenoid directional valves 93, 93.S are connected together via a gallery 95, wherein the gallery 95 is connected via a further pneumatic line 96 to the pneumatic line 60 via the compressed air connection 2. The bellows 91 or pressure accumulator 92 is connected via bellows branch lines 91L or a pressure accumulator line 92L to the bellows or accumulator valves designed as directional valves 93, 93.S. The bellows or accumulator valves designed as directional valves 93, 93.S are connected upstream of the bellows 91 or pressure accumulator 92 so that they can block against the gallery 95 or open to the gallery 95. A height sensor 97 is allocated to each bellows 91, data from which can be transmitted in particular to the ECU via a sensor line 45 and the plug connection 50 or databus 40.

To operate the pneumatic assembly 90—depending on the height level measured—the bellows 91 forming air springs can be filled with compressed air from the compressed air supply assembly 10 via the compressed air connection 2; this then serves to raise the level of the vehicle superstructure 200. Conversely, the air bellows 91 can be purged to a purge connection 3 in the opposite direction via the compressed air connection 2 so that the level of the vehicle superstructure 200 falls under the escape of compressed air from the bellows 91. To fill the pneumatic assembly 90 via the compressed air connection 2, the purge valve 71 is in the unpowered, closed state against the purge connection 3 as shown in FIG. 1. Also the first and second control valve connections X2, Y2 are pneumatically separated, i.e., the first part 110.1 of the pneumatic control line 110 is closed against the second part 110.2 of the pneumatic control line 110; this leads to the uncontrolled, closed position of the purge valve 71.

To purge the pneumatic assembly 90, a suitable current is supplied to the magnetic coil of the control valve 81 by means of a current signal carried via the electrical control line 46; as a result, the magnetic coil of the control valve 81 is powered and opened against the spring pressure of the control valve spring 82. Thus, the pneumatic control line 110 is opened via the control valve 81, i.e., the first part 110.1 of the pneumatic control line 110 with the second part 110.2 of the pneumatic control line 110 is opened to the pressure control connection 71S. A control pressure present in the pneumatic control line 110 is built up at the pressure control connection 71S and acts against the force of the purge valve spring 72 of the purge valve 71, so that finally the first purge valve connection X1 is opened to the second purge valve connection Y1 of the purge valve 71; thus, the purge line 70 and an output of the air dryer 61 are opened to the purge connection 3. With valve connections X1, Y1 of the purge valve 71 in the purge line 70 opened in this way, control pressure is maintained at the pressure control connection 71S because of the pressure present in the bellows 91, which is present in the pneumatic main line 60 when the level control valve, i.e., the bellows or accumulator valve in the form of a directional valve 93, 93.S is open, and, hence, available as a control pressure in the pneumatic control line 110.

In addition, according to the embodiments discussed below, when the valve connections X1, Y1 of the purge valve in the purge line 70 are open, control pressure is maintained at the pressure control connection 71S; this is independent of pressure in the purge line 70 and the pneumatic main line 60. In particular, by means of a pressure-maintaining pneumatic device 120, the control pressure can be maintained although a pressure in the purge line and pneumatic main line 60 falls below a residual maintaining pressure, i.e., a pressure predefined by the purge valve spring 72 of the purge valve 71. For this, the necessary control pressure in the pneumatic control line 110 can be selected variably, in particular adjusted variably via the purge valve spring 72 of the purge valve 71. Thus, according to the embodiments explained below, it is guaranteed that the pressure in the purge line 70 and the pneumatic main line 60 can fall practically to an ambient pressure so that the bellows 91 can be purged to ambient pressure.

For this, the embodiment shown in FIG. 1 provides that the control valve 81 is modified in the form of a 2/2-way valve, the operation of which is described in more detail with reference to FIG. 2.

FIG. 1, as a preferred embodiment for the formation of a pressure-maintaining pneumatic device 120, shows a control valve 81 designed in the present case as a 2/2-way valve. To purge the bellows 91, the 2/2-way solenoid valve is opened by powering the magnetic coil for a specific duration and then closed again by disconnection of the power, i.e., the control valve 81 is controlled by means of a control pulse pair delimiting the control interval, for example opened by a double pulse, via the electrical control line 46 for a control interval of a specific interval duration sufficient to build up a control pressure in the second part 110.2 of the pneumatic control line 110 at the pressure control connection 71S. As the control valve 81 is only open during the control interval and is then closed again, the control pressure in the pre-control channel of the pneumatic control line 110, i.e., in the second part 110.2 of the pneumatic control line 110, can be maintained at the initial pressure level. The relay piston of the purge valve 71 then remains open against the spring pressure of the purge valve spring 72 of the purge valve 71.

To end the purge process, first the bellows valves formed as directional valves 93 are closed. As a result, the pressure in the dryer 61 falls to ambient pressure, i.e., atmospheric pressure. The 2/2-way valve as control valve 81 is then opened; preferably also only for a specific interval duration. In other words, for the purge process too, the control valve 81 in the form of a 2/2-way valve is opened by a control pulse pair delimiting a control interval, for example a double pulse, via the electrical control line 46 for a specific interval duration. The pressure in the pre-control channel, i.e., in the pneumatic control line 110, diminishes due to the relatively large air dryer volume of the air dryer 61 and the purge valve spring 72 can close the relay piston of the purge valve 71 against ambient pressure during the open state of the 2/2-way valve in the control interval. To end the purge process and for example convert an inactivated state of the air dryer assembly 10 or for a filling process, the control interval is initiated by a further closure of the 2/2-way valve at the end of the interval duration. As a result, the pneumatic control line 110 is closed against the pneumatic main line 60; i.e., the first part 110.1 of the pneumatic control line 110 is pneumatically separated from the second part 110.2 in the unpowered closed state of the control valve 81 or in the form of the 2/2-way valve.

The embodiment depicted in FIG. 1 is not restricted to the shown line routing in the pneumatic assembly to the pneumatic control line 110. Rather, a line routing can also be provided between the pressure accumulator 92 and the pneumatic control line 110, with a third part of the control line between the pressure accumulator line 92L and the pneumatic control line 110, without being connected to the pneumatic main line 60.

Figure 2:
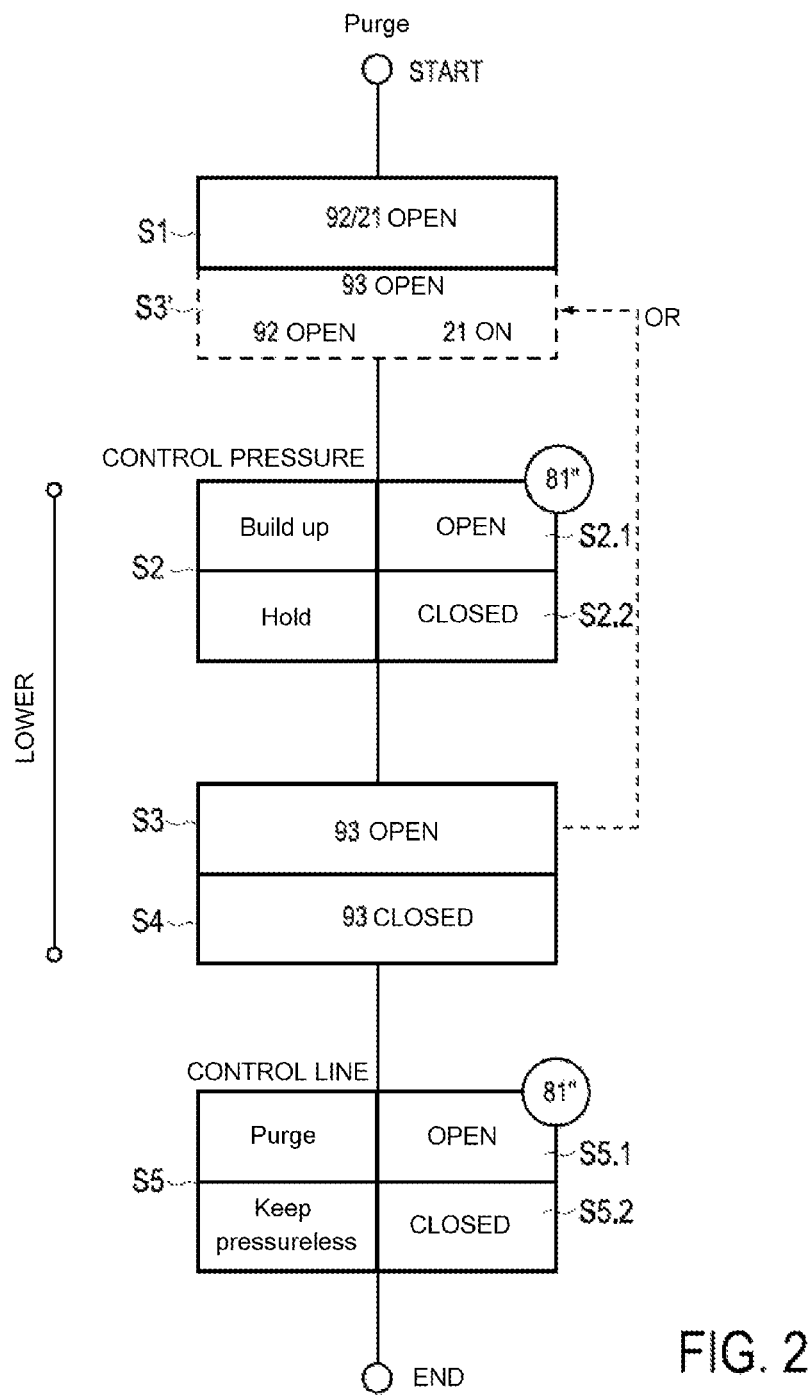
FIG. 2 is a flow diagram illustrating an interval control functionality in accordance with an embodiment of the present invention.

FIG. 2 shows diagrammatically the fundamental course of a purge process for a compressed air supply assembly 10 of FIG. 1 by means of a control valve 81 in the form of a 2/2-way valve. In a first step S1, the compressor 21 is activated and the air dryer 61 and the pneumatic control line 110 are pneumatically charged. To initiate a purge process, in the first step S1 it can also be ensured that the pressure accumulator 92 has adequate system pressure sufficient to provide a control pressure in the pneumatic control 110 or at the pressure control connection 71 of the purge valve 71. For this, where applicable, the pressure accumulator 92 can be charged by activating the compressor 21, and the accumulator valve in the form of a directional valve 93.S connected upstream of the pressure accumulator 92 is opened; and directional valve 93.S assumes the state OPEN.

The purge phase is then initiated by an electromagnetic interval-control step S2 at the control valve 81 by building up pressure—S2.1; control valve 81 and, where applicable, directional valve 93.S assume the state OPEN—and maintaining pressure—S2.2; control valve 81 and, where applicable, directional valve 93.S assume the state CLOSED—a control pressure also in the second part 110.2 of the pneumatic control line 110 at the pressure control connection 71S. For this, in a first state S2.1, at the start of the interval and to build up the control pressure at the pressure control connection 71S, the first and second control valve connections X2, Y2 of the control valve 81 are opened, i.e., connected together pneumatically; namely, by means of a first pulse of an electromagnetic double pulse at the magnetic coil of the control valve 81. After expiry of a predetermined interval duration, to end the interval and to maintain control pressure at the pressure control connection 71S, the power to the control valve 81 is switched off; namely, by means of a second pulse of an electromagnetic double pulse. Consequently, control valve 81 returns to the unpowered state shown in FIG. 3 and the second control valve connections X2, Y2 are separated; i.e., in step S2.2 the control valve 81 is in the closed state.

The relay piston of the purge valve 71 opens, and by opening of the directional valves 93 serving as bellows valves in step S3, the purge process can be initiated—S3; directional valve 93 assumes the state OPEN. The purge process is ended in a step S4 by closing the directional valves 93 serving as bellows valves—S4; directional valve 93 assumes the state CLOSED.

In a derived method also shown in FIG. 2 in dotted lines, step S3 can also be carried out as step S3' before step S2. In this case, the directional valves 93 serving as bellows valves are already open before the interval control functionality of the control valve 81 of step S2 is performed—S3'; directional valve 93 assumes the state OPEN. In this case, the control pressure is built up fully or partly with bellows pressure; the control pressure, where applicable, is ensured additionally—independently of a pressure in the purge line 70 and/or the pneumatic main line 60—either by switching on the pressure accumulator 92 or by briefly switching on the compressor 21—S3'; directional valve 93.S assumes the state OPEN. In both cases, the directional valves 93 serving as bellows valves are closed. In this case too, an interval control functionality for the control valve 81 leads to the build up and maintenance of the control pressure as explained with reference to step S2.

After ending the purge process in step S4, finally in step S5 by a further interval control of the control valve 81 in the form of the 2/2-way valve, the second part 110.2 of a pneumatic control line 110, i.e., the pressure control connection 71S, is pressure-relieved or set to ambient pressure. For this, the second part 110.2 or the entire pneumatic control line 110 is purged in step S5.1 by opening the first and second control valve connections X2, Y2 of control valve 81 at the start of the interval control functionality; i.e., control valve 81 is briefly powered and transfers into the powered state; the pressure contained in the second part 110.2 can escape via the air dryer 61 in the pneumatic main line 60 and the choke 62—S5.1; control valve 81 assumes the state OPEN. After a predetermined interval duration, in step S5.2 the power to control valve 81 is switched off and this returns to the unpowered state shown in FIG. 3 and thus closes the first part 110.1 against the second part 110.2 of a pneumatic control line 110. The relay piston of the purge valve 71 is then at switch pressure, which lies above ambient pressure, and the purge valve spring 72 of the purge valve 71 closes this into the uncontrolled state shown in FIG. 1 so that the purge line 70 is closed as a result of the pneumatically separated first and second purge valve connections X1, Y1—S5.2; control valve 81 assumes the state CLOSED. The purge process is thus ended and can be repeated again from step S1. At the start of step S2.1 until the end of step S4, a lowering of the vehicle superstructure 200 is implemented because of the air volume escaping from the bellows 91, for example for the front axle 210 and/or the rear axle 220.

Figure 3:
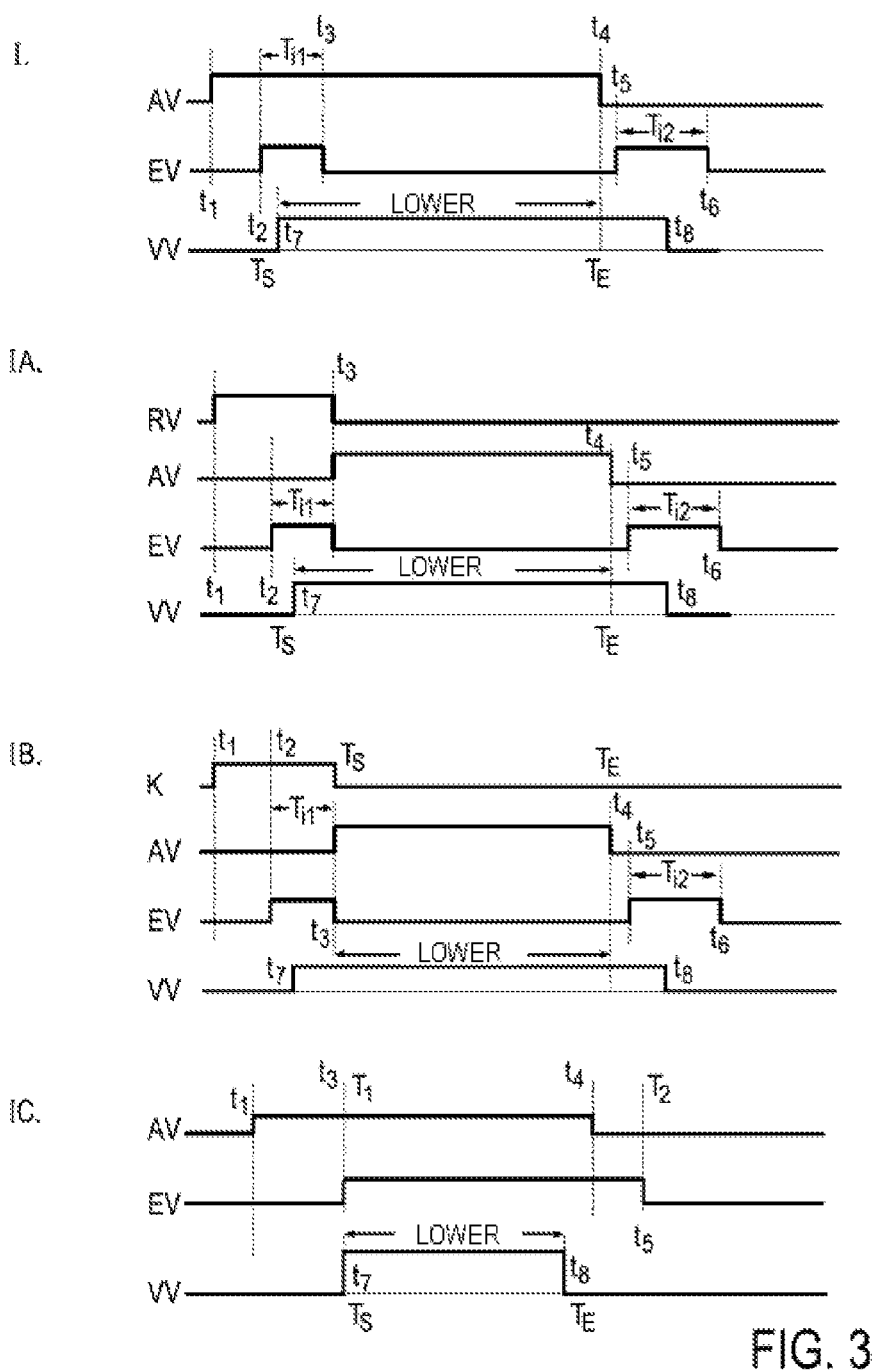
FIG. 3 shows a sequence of different switching pulses for a bellows valve (AV; directional valve 93), a purge valve (VV; purge valve 71) and a control valve (EV, control valve 81) utilizing an interval control functionality for the control valve to realize a purge functionality in accordance with an embodiment of the present invention; specifically:
  in I for lowering by means of 2/2 control valve 81 without residual pressure,
  in IA for lowering by means of 2/2 control valve 81 without residual pressure (pilot pressure from pressure accumulator 92),
  in IB for lowering by means of 2/2 control valve 81 without residual pressure (pilot pressure from compressor 21),
  in IC for lowering by means of 2/2 control valve 81 with residual pressure.
Figure 4:
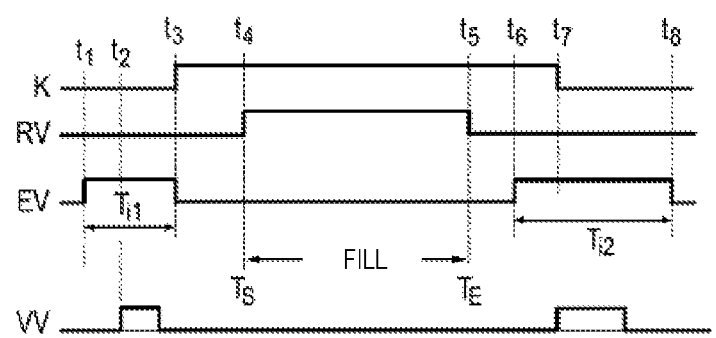
FIG. 4 shows a sequence of different switching pulses for the filling of a pressure accumulator of a pneumatic assembly, that is, for a compressor blower (K in a compressor 21) and/or an accumulator valve (RV; directional valve 93.S) and a bellows valve (AV; directional valve 93) and a control valve (EV; control valve 81) and a purge valve (VV; purge valve 71) in accordance with an embodiment of the present invention; specifically:
  in IIA for a filling of the pressure accumulator 92, in particular with a discharge of pressure into the atmosphere at the end of the filling process,
  in IIB for a filling of the pressure accumulator 92 with a discharge of pressure at the end of the filling process, wherein the gallery 95 purges firstly into a bellows 91 and then into atmosphere.
Figure 4:
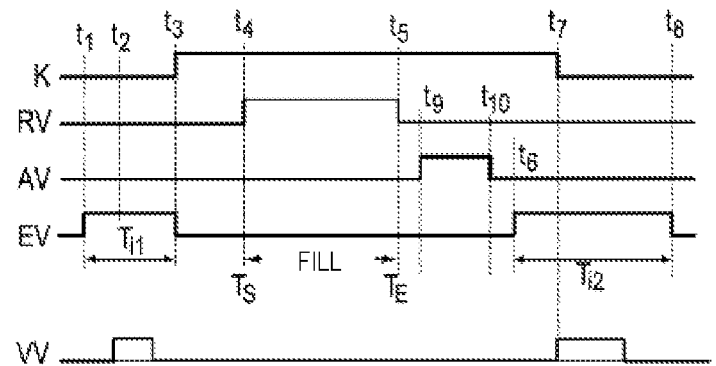
Figure 5:
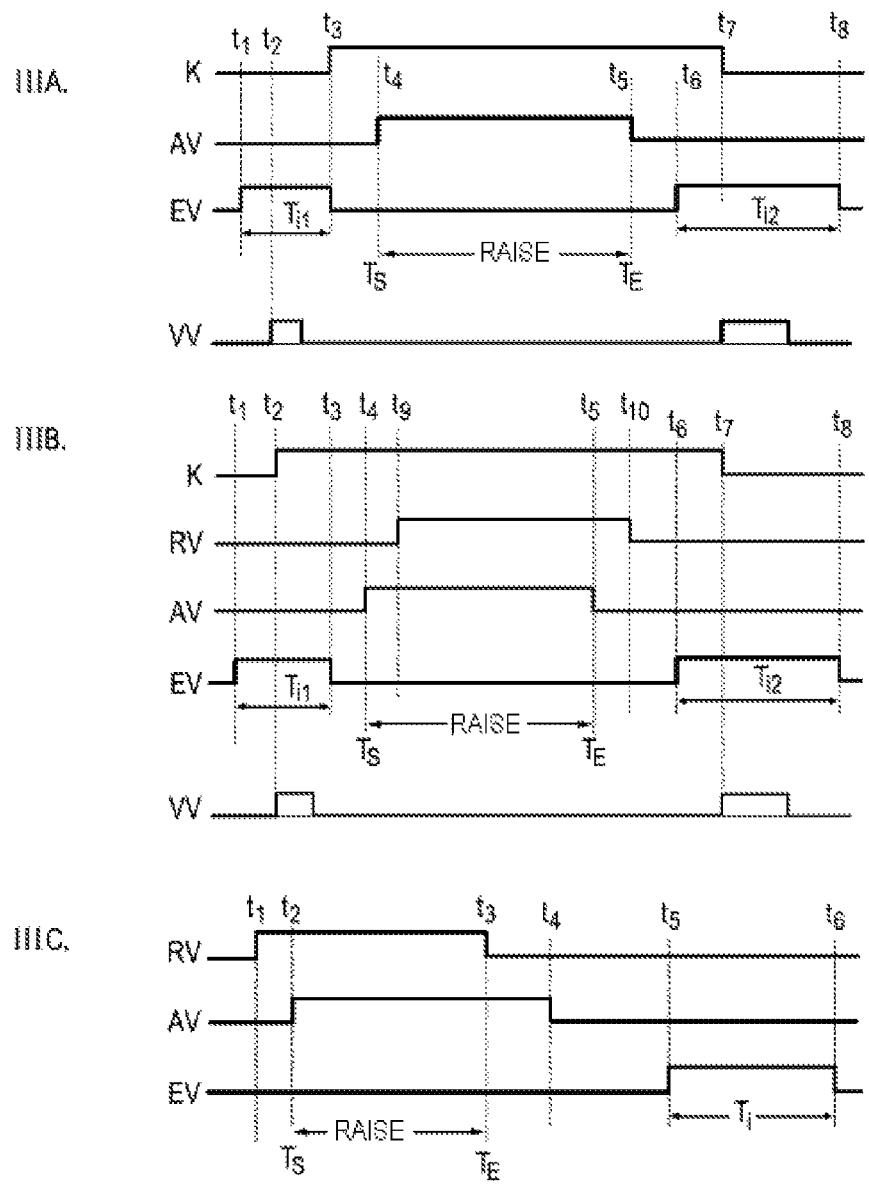
FIG. 5 shows a sequence of different switching pulses for a compressor blower (K in a compressor 21), a bellows valve (AV; directional valve 93), a pressure accumulator (RV; directional valve 93.S) and a control valve (EV; control valve 81) and a purge valve (VV; purge valve 71) for a filling function of the air spring assembly in accordance with an embodiment of the present invention; specifically:
  in IIIA for raising by means of compressor 21 (or else for a tire filling function),
  in IIIB for raising by means of compressor 21 and pressure accumulator 92,
  in IIIC for raising by means of bellows 91,
  in IIID for flooding the gallery 95 (in the example of raising by means of a compressor blower) from a reservoir for the reliable opening of the purge valve 71 as per characteristic curve VV.
Figure 5:
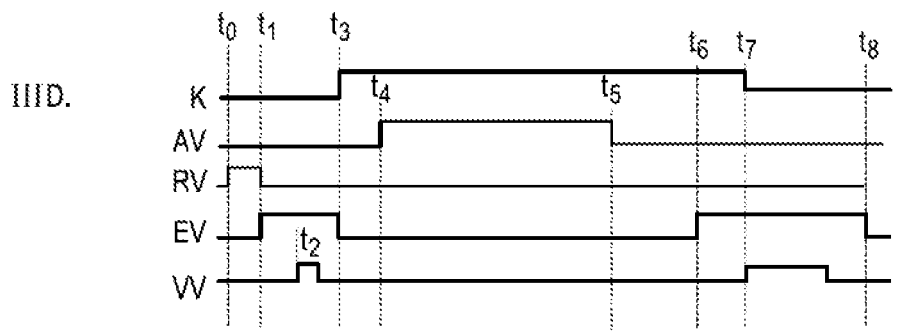

FIGS. 3, 4 and 5 show, in each case, switching characteristic curves for a bellows valve, that is, a directional valve 93 shown in FIG. 1 and FIG. 2, in a bellows branch line 91L and for a purge valve 71 and for a control valve 81; where appropriate, a switching characteristic curve for a compressor 21 and a pressure accumulator 92, and for a solenoid directional valve 93.S in an accumulator branch line 92L, is also shown. The corresponding characteristic curves are denoted by AV (Airspring Valve for a bellows valve in the form of the directional valve 93), EV (Exhaust Valve for control valve 81) and VV (Ventilation Valve in the form of the purge valve 71) and K (for the compressor blower in the compressor 21) and RV (Reservoir Valve in the form of a directional valve 93.S).

FIG. 3 shows, in a partial view I, a lowering process for the vehicle superstructure by means of a 2/2 directional valve as a control valve 81, without a retaining pressure being maintained, that is, utilizing a purging process down to ambient pressure. Partial views IA and IB illustrate particularly preferred derivations that likewise avoid a retaining pressure. Whereas, in partial view I, the control pressure for the control of the control valve 81 originates substantially from the bellows 91 (AV opens directional valve 93 before EV control valve 81 opens; the two processes may also overlap), it is the case in the derivation IA that the control pressure is provided from the pressure accumulator 92 (RV opens directional valve 93.S before EV control valve 81 opens) and in the derivation IB that the control pressure is provided from the compressor 21 (K starts compressor 21 before or while EV control valve 81 opens). The derivation of partial view IC provides a lowering process utilizing the 2/2 solenoid directional valve as control valve 81, in which a retaining pressure is maintained. Here, a time interval T from a time $t_1$ after the opening of a bellows valve to a time $t_2$ after the closing of a directional valve 93, which serves as bellows valve, is spanned.

In partial view I, a directional valve 93, which serves as bellows valve, opens at time $t_1$, and subsequently the control valve 81 opens at time $t_2$. While the control valve 81 is open, the purge valve 71 opens at a time $t_7$, and the control valve 81 closes at a time $t_3$. At a time $t_4$, the directional valve 93 also closes. Subsequently, the control valve 81 opens at a time $t_5$, and while the control valve 81 is open, the purge valve closes at a time $t_8$; the control valve 81 subsequently closes at a time $t_6$. As can be seen from partial view I, as per the characteristic curve AV, the directional valve 93, which serves as bellows valve, switches before a first electromagnetic interval control with a first time interval Ti1 of the control valve 81 as per characteristic curve EV. The lowering process recognizable from the switching characteristic curve VV of the purge valve 71 begins at the time $T_S=t_7$—specifically with charging of the pressure control connection 71S in a first time interval Ti1=$t_3$-$t_2$ of the control valve 81—and ends at the time $T_E=t_4$—specifically with discharging of the pressure control connection 71S with a second time interval Ti2 of the control valve 81. During the lowering process between the times $T_S$ and $T_E$—substantially in the region between the first electromagnetic interval control process and the start of the second electromagnetic interval control process, that is, from the end of the time interval Ti1 to the start of the time interval Ti2—the control pressure at the pressure control connection 71S is maintained or held constant. The control pressure is provided from the bellows 91, since the solenoid directional valves 93 open, as per characteristic curve AV, before the first electromagnetic interval control process.

This also applies with regard to the derivation as per partial view IC—the derivation, however, provides a residual maintaining pressure, or must provide a residual maintaining pressure, in bellows 91. For this purpose, as per characteristic curve EV, the control valve 81 closes after a bellows valve formed as directional valve 93, as per characteristic curve AV. The lowering process is restricted to a time period $T_S=t_7$ to $T_E=t_8$. In concrete terms, the directional valve 93, which serves as bellows valve, opens at a time $t_1$. The control valve 81 opens at a time $t_3$, and subsequently, the purge valve 71 opens at a time $t_7$. The purge valve 71 closes again at a time $t_8$. The directional valve 93 subsequently closes at a time $t_4$, and in turn, the control valve 81 subsequently closes at a time $t_5$.

The partial views IA and IB are substantially identical with regard to the characteristic curves AV, VV and EV. The lowering process takes place between the times $T_S$ and $T_E$. In both cases, a bellows valve in the form of the solenoid directional valve 93 closes, as per characteristic curve AV, before a second electromagnetic interval control process of the control valve 81 as per characteristic curve EV. In both cases, a bellows valve in the form of the solenoid directional valve 93 opens, as per characteristic curve AV, after or at the end of a first electromagnetic interval control process of the control valve 81 as per characteristic curve EV.

In concrete terms, in partial view IA, the directional valve 93.S, which serves as accumulator valve, opens at a time $t_1$ and the control valve 81 subsequently opens at a time $t_2$. While the control valve 81 is open, the purge valve 71 opens at a time $t_7$. Upon the closure of the control valve 81 at a time $t_3$, the directional valve 93.S, which serves as accumulator valve, also closes—in return, the directional valve 93, which serves as bellows valve, opens at the same time $t_3$ and closes again at a later time $t_4$.

Subsequently, the control valve 81 opens at a time $t_5$, and while the control valve 81 is open, the purge valve 71 closes at a time $t_8$. The control valve 81 subsequently closes at a time $t_6$. In partial view IA, a solenoid directional valve 93 as bellows valve opens, as per characteristic curve AV, only after or at the end of a first electromagnetic interval control process for the control valve 81 as per characteristic curve EV; a pressure accumulator 92 is however opened prior to this as per characteristic curve RV. In this case, a lowering process begins upon the opening of the purge valve 71 at the time $T_S=t_7$ as per characteristic curve VV and ends upon the closing process of the directional valve 93 at time $T_E=t_4$ as per characteristic curve AV.

Advantageously, a constant control pressure is maintained at the control valve 81 during the entire lowering process independently of the pressure in the purge line 70 and in the pneumatic main line 60. In partial view IA, the control pressure is extracted from a pressure accumulator 92, whose accumulator valve in the form of a solenoid directional valve is switched as per characteristic curve RV. For the first electromagnetic interval control process of the control valve 81, therefore, an adequate pressure amplitude is available to build up the control pressure during the time interval Ti1=$t_3$-$t_2$ and maintain it after the end of the first time interval Ti1. Purging of the pneumatic control line 110 takes place, in turn, after the closing of the bellows valve, that is, after the time $T_E$ during a second time interval Ti2=$t_6$-$t_5$, as per characteristic curve EV.

In partial view IB, the compressor blower of a compressor 21 is operated at a time $t_1$, and during the operation, the control valve 81 opens at a time $t_2$. At a time $t_3$, the operation of the compressor blower is stopped and the control valve 81 closes; this however takes place only after the purge valve 71 has opened at a time $t_7$. The directional valve 93, which serves as bellows valve, opens at the same time $t_3$ and closes again at a time $t_4$. The control valve 81 opens at a later time $t_5$, and while the control valve is open, the purge valve closes at a time $t_8$; the control valve 81 subsequently closes at a time $t_6$. As per partial view IB, the pressure is provided by brief operation of the air compressor 21 as per characteristic curve K before and during the first time interval Ti1. In partial view IB, too, a solenoid directional valve as bellows valve opens, as per characteristic curve AV, only after or at the end of a first electromagnetic interval control process with time interval Ti1 for the control valve 81 as per characteristic curve EV; a compressor 21 however runs while the control valve 81 is open. In this case, as per characteristic curve VV, the purge valve 71 opens at the start of or during the first electromagnetic time interval control process Ti1=$t_3$-$t_2$, and closes at the start of or during the second electromagnetic time interval control process Ti2=$t_6$-$t_5$. A lowering process begins upon the opening of the directional valve 93 at time $T_S=t_3$ as per characteristic curve AV, and ends upon the closing process of the directional valve 93 at time $T_E=t_4$ as per characteristic curve AV.

FIG. 4 illustrates, in the partial views IIA and IIB, how filling of the pressure accumulator 92 can take place. In concrete terms, as per partial view IIA, the control valve 81 opens at time $t_1$, and while open, the purge valve 71 also opens at a time $t_2$ and closes again, before the control valve 81, at a time $t_3$. At the same time $t_3$, the compressor blower of a compressor 21 starts up. The filling process starts upon the opening of an accumulator valve at a time $t_4=T_S$. The filling process ends upon the closing of an accumulator valve at a time $t_5=T_E$. The control valve 81 subsequently opens at a time $t_6$, and while open, the purge valve 71 opens at a time $t_7$; this however takes place only at or after the end of the operation of the compressor blower at a time $t_7$. Before the control valve closes at a time $t_8$, the purge valve 71 is already closed.

It is, for example, possible, as per partial view IIA, for the control valve 81 to first be switched, and moved into the open state, by means of an electromagnetic interval control process, as per characteristic curve EV. A compressor blower start-up is thus realized with the lowest possible counterpressure. After or during the first time interval $Ti1=t_3-t_1$, the operation of the air compressor 21 is started. The control valve 81 is actuated, as per characteristic curve EV, before the compressor 21, in particular the compressor blower, is actuated. In a preferred embodiment, an actuation of the control valve 81 can take place only when a gallery pressure, determined for example by means of a pressure sensor 94, is higher than a predetermined threshold value. Here, if the gallery pressure lies below the predetermined threshold value, a characteristic curve EV and K can be adapted such that an actuation of the control valve 81 before the compressor 21 is prevented.

Partial view IIB shows substantially the same process with regard to the characteristic curves K, RV and EV. However, after the closing of the pressure accumulator 92 as per characteristic curve RV for the directional valve 93.S, the bellows valve is first opened, such that the pressure supply assembly 10 is purged into the bellows 91 connected via the bellows valve, before the purge valve 71 is closed as per characteristic curve VV—actuated by the control valve 81 as per characteristic curve EV—during time interval $Ti2=t_9-t_6$. In concrete terms, the bellows valve opens at a time $t_9$ directly after the accumulator valve closes at the time $t_5$. The bellows valve closes again at a time $t_{10}$ directly before the control valve 81 opens at a time $t_6$, and while the compressor blower is still running.

The same chronological sequence $t_1$ to $t_8$ also applies to the raising processes shown in partial views IIIA and IIIB in FIG. 5, with the difference that the directional valve 93 as bellows valve is switched in each case at the times $t_4$ and $t_5$, whereas an accumulator valve 93.S is switched at the times $t_9$ and $t_{10}$ in partial view IIIB; this takes place with a time offset, that is, $t_9$ follows $t_4$, and $t_{10}$ follows $t_5$.

FIG. 5 shows, in partial views IIIA, IIIB, IIIC and IIID, the basic, intercoordinated characteristic curve profile of directional valve 93, which serves as bellows valve, and/or of directional valve 93.S, which serves as accumulator valve, in relation to control valve 81. In the characteristic curves IIIA, IIIB and IIID, a first electromagnetic interval control with time interval $Ti1=t_3-t_1$ and a second electromagnetic interval control with time interval $Ti2=t_8-t_6$ as per characteristic curve EV precedes and follows, respectively, an opening and closing of a directional valve 93, which serves as bellows valve, as per characteristic curve AV. As can be seen in each case from the characteristic curves K for an air compressor 21, compressed air is provided from the compressed air supply in order, as per partial view IIIA, to supply compressed air to a bellows or a tire inflation function, or as per partial view IIIB, to also supply compressed air to a pressure accumulator (and, thus, for example, use the pressure accumulator as a pressure source for raising in addition to the compressor 21), when a corresponding solenoid directional valve before the pressure accumulator 92 opens and closes as per characteristic curve RV.

As per partial view IIIC, an accumulator valve in the form of the directional valve 93.S first opens at a time $t_1$, and a bellows valve in the form of the directional valve 93 subsequently opens at a time $t_2$. The accumulator valve subsequently closes at a time $t_3$, and the bellows valve subsequently also closes at a time $t_4$. The control valve 81 opens at a time $t_5$ and closes at a time $t_6$.

Partial view IIIC shows a special case in which filling of the pneumatic assembly 90 can take place from the pressure accumulator 92. For this purpose, the solenoid directional valve 93.S in the accumulator branch line 92L before the pressure accumulator 92 first opens, and a bellows valve in the form of a solenoid directional valve 93 opens subsequently. In this way, a vehicle superstructure can be raised with compressed air from the pressure accumulator 92 by virtue of the bellows being filled. The end of the process as a result of the closing of the bellows valve as per characteristic curve AV may be followed by a short purging process, in which the control valve 81 is briefly opened in the time interval $Ti=t_6-t_5$ and then closes again as per characteristic curve EV. In all of the partial views IIIA, IIIB, IIIC, a raising process is restricted to the time period between the times $T_S$ and $T_E$, the time period ending upon the closing of a bellows valve and/or accumulator valve at the time $T_E$. The raising process is initiated upon the start of the first electromagnetic interval control with time interval Ti1 in partial view IIIA, in the same way in partial view IIIB, and upon the opening of an accumulator valve before a pressure accumulator 92 at the time $T_S$ in partial view IIIC.

Partial view IIID shows, with substantially identical times $t_1$ to $t_8$, the characteristic curve profile of the characteristic curves K, AV, EV, VV. For raising by means of compressor blower between the times $T_S=t_4$ and $T_E=t_5$, first the gallery 95 is flooded. For this purpose, compressed air is extracted from a reservoir, such as the pressure accumulator 92, for the reliable opening of the purge valve 71 at the time $t_2$ by virtue of the directional valve 93.S, which is in the form of an accumulator valve, being opened at the time $t_0$ already before the opening of the control valve 81 and being closed at the time $t_1$ when the control valve 81 opens.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A compressed air supply assembly for operating a pneumatic assembly, the compressed air supply assembly comprising:
    a compressed air supply;
    a compressed air connection to the pneumatic assembly;
    a purge connection to the environment;
    a pneumatic main line between the compressed air supply and the compressed air connection, the pneumatic main line including an air dryer;
    a purge line between the compressed air connection and the purge connection;
    a solenoid valve arrangement including a 2/2 way control valve to control a purge valve, the 2/2 way control valve being connected to a control valve connection in a pneumatic control line connected to a pressure control connection of the purge valve, and the purge valve being connected to a purge valve connection in the purge line; and
    a pressure-maintaining pneumatic device connected to the pneumatic control line, the pressure-maintaining pneumatic device being adapted to maintain control pressure at the pressure control connection independently of pressure in at least one of the purge line and the pneumatic main line when the purge valve connection of the purge valve in the purge line is open.

2. The compressed air supply assembly as claimed in claim 1, wherein the pressure-maintaining pneumatic device is adapted to maintain pressure at the pressure control connection when the purge valve connection of the purge valve in the purge line is open such that pressure in at least one of the purge line and the pneumatic main line is variably selectable, including below a residual maintaining pressure.

3. The compressed air supply assembly as claimed in claim 2, wherein the purge valve includes a variably adjustable purge valve spring for predefining the residual maintaining pressure.

4. The compressed air supply assembly as claimed in claim 1, wherein the pressure-maintaining pneumatic device is adapted to maintain pressure at the pressure control connection when the purge valve connection of the purge valve in the purge line is open such that pressure in at least one of the purge line and the pneumatic main line can fall to about ambient pressure.

5. The compressed air supply assembly as claimed in claim 1, wherein the pressure-maintaining pneumatic device is formed only with the control valve, and wherein the control valve includes a first and a second control valve connection, which are connected in the pneumatic control line.

6. The compressed air supply assembly as claimed in claim 5, wherein the control valve is electromagnetically interval-controllable such that at the start of an interval, to build up a control pressure at the pressure control connection, the first and second control valve connections are opened, and to end the interval, to maintain the control pressure at the pressure control connection, the first and second control valve connections are closed.

7. The compressed air supply assembly as claimed in claim 1, wherein the pneumatic control line has no connection to the pneumatic main line and branches from an accumulator branch line leading to a pressure accumulator.

8. The compressed air supply assembly as claimed in claim 1, wherein the pneumatic control line branches from the pneumatic main line and is switchably connected to at least one of an air compressor, a bellows and a pressure accumulator.

9. A pneumatic system, comprising the compressed air supply assembly as claimed in claim 1; and a pneumatic assembly, the pneumatic assembly being an air spring assembly comprising a gallery and at least one branch line pneumatically connected to the gallery, the at least one branch line including at least one of a bellows and a pressure accumulator, and a directional valve arranged before the at least one of the bellows and the pressure accumulator.

10. The compressed air supply assembly as claimed in claim 1, wherein the pneumatic assembly is an air spring assembly of a vehicle.

11. A method for controlling a compressed air supply assembly for operating a pneumatic assembly, wherein the compressed air supply assembly comprises:
a compressed air supply,
a compressed air connection to the pneumatic assembly,
a purge connection to the environment,
a pneumatic main line between the compressed air supply and the compressed air connection, the pneumatic main line including an air dryer,
a purge line between the compressed air connection and the purge connection,
a solenoid valve arrangement including a 2/2 way control valve to control a purge valve, the 2/2 way control valve being connected to a control valve connection in a pneumatic control line connected to a pressure control connection of the purge valve, and the purge valve being connected to a purge valve connection in the purge line;
the method comprising:
connecting a pressure-maintaining pneumatic device to the pneumatic control line,
building up control pressure at the pressure control connection of the purge valve,
opening the purge valve connection of the purge valve into the purge line, and
maintaining the control pressure at the pressure control connection of the purge valve independently of pressure in at least one of the purge line and the pneumatic main line when the purge valve connection of the purge valve is open.

12. The method as claimed in claim 11, wherein the pressure-maintaining pneumatic device is formed with the control valve, wherein the control valve comprises a first and a second control valve connection, which are connected in the pneumatic control line, the method further comprising effecting electromagnetic interval-control of the control valve by opening the first and the second control valve connections at the start of an interval to build up the control pressure at the pressure control connection, and closing the first and the second control valve connections to end the interval and to maintain the control pressure at the pressure control connection.

13. The method as claimed in claim 12, further comprising effecting a first electromagnetic interval control of the control valve one of before or at the start of purging of the purge line and of the pneumatic main line, and effecting a second electromagnetic interval control of the control valve one of at and after the end of purging of the purge line and of the pneumatic main line.

14. The method as claimed in claim 12, further comprising effecting a first electromagnetic interval control of the control valve one of before, during and after opening a directional valve arranged before at least one of a bellows and a pressure accumulator.

15. The method as claimed in claim 14, further comprising effecting a second electromagnetic interval control of the control valve one of during and after closing the directional valve.

16. The method as claimed in claim 14, further comprising effecting a second electromagnetic interval control of the control valve based on a magnitude of a pressure in at least one of the bellows and pressure accumulator.

17. The method as claimed in claim 16, wherein the second electromagnetic interval control is effected when pressure in the bellows corresponds to one of a predefined residual pressure and ambient pressure.

18. The method as claimed in claim 11, wherein the pneumatic assembly is an air spring assembly of a vehicle.

* * * * *